(12) United States Patent
Montgomery et al.

(10) Patent No.: US 8,229,602 B2
(45) Date of Patent: Jul. 24, 2012

(54) ELECTRICAL POWER DISTRIBUTION SYSTEM

(75) Inventors: Steven Montgomery, Kitchener (CA); Nicolas Jones, Kitchener (CA)

(73) Assignee: 2D2C, Inc., Gurnee, IL (US)

( * ) Notice: Subject to any disclaimer, the term of this patent is extended or adjusted under 35 U.S.C. 154(b) by 164 days.

(21) Appl. No.: 12/689,913

(22) Filed: Jan. 19, 2010

(65) Prior Publication Data

US 2010/0185338 A1    Jul. 22, 2010

Related U.S. Application Data

(60) Provisional application No. 61/145,604, filed on Jan. 19, 2009.

(51) Int. Cl.
*G05D 11/00* (2006.01)
(52) U.S. Cl. ........................ 700/295; 700/291
(58) Field of Classification Search .................. 700/286
See application file for complete search history.

(56) References Cited

U.S. PATENT DOCUMENTS

| 5,319,514 | A | | 6/1994 | Walsh et al. | |
|---|---|---|---|---|---|
| 5,696,695 | A | * | 12/1997 | Ehlers et al. | 700/286 |
| 6,519,509 | B1 | * | 2/2003 | Nierlich et al. | 700/286 |
| 6,618,648 | B1 | * | 9/2003 | Shirota et al. | 700/291 |
| 6,681,154 | B2 | * | 1/2004 | Nierlich et al. | 700/286 |
| 6,751,562 | B1 | * | 6/2004 | Blackett et al. | 702/61 |
| 6,961,641 | B1 | * | 11/2005 | Forth et al. | 700/295 |
| 6,988,025 | B2 | * | 1/2006 | Ransom et al. | 700/295 |
| 7,062,360 | B2 | * | 6/2006 | Fairlie et al. | 700/286 |
| 7,188,003 | B2 | * | 3/2007 | Ransom et al. | 700/286 |
| 7,231,280 | B2 | * | 6/2007 | Costa | 700/286 |
| 7,379,791 | B2 | * | 5/2008 | Tamarkin et al. | 700/286 |
| 7,636,615 | B2 | * | 12/2009 | Pfingsten et al. | 700/286 |
| 7,965,195 | B2 | * | 6/2011 | Deaver et al. | 340/660 |
| 2002/0169523 | A1 | * | 11/2002 | Ross et al. | 700/286 |
| 2004/0034484 | A1 | | 2/2004 | Solomita, Jr. et al. | |
| 2004/0088083 | A1 | * | 5/2004 | Davis et al. | 700/295 |
| 2004/0107025 | A1 | * | 6/2004 | Ransom et al. | 700/286 |
| 2004/0193329 | A1 | * | 9/2004 | Ransom et al. | 700/286 |
| 2005/0144437 | A1 | * | 6/2005 | Ransom et al. | 713/151 |
| 2005/0251296 | A1 | * | 11/2005 | Tracy Nelson et al. | 700/292 |
| 2006/0052905 | A1 | * | 3/2006 | Pfingsten et al. | 700/286 |
| 2006/0125422 | A1 | * | 6/2006 | Costa | 315/294 |
| 2006/0178783 | A1 | * | 8/2006 | Herbold et al. | 700/286 |
| 2007/0005193 | A1 | * | 1/2007 | Nelson et al. | 700/286 |
| 2007/0100504 | A1 | * | 5/2007 | Moxley | 700/286 |
| 2007/0177314 | A1 | * | 8/2007 | Weng et al. | 361/20 |
| 2008/0201019 | A1 | * | 8/2008 | Kumar et al. | 700/286 |

(Continued)

FOREIGN PATENT DOCUMENTS

AU    766009    10/2003

(Continued)

*Primary Examiner* — Albert Decady
*Assistant Examiner* — Anthony Whittington
(74) *Attorney, Agent, or Firm* — Matthew A. Pequignot; Pequignot + Myers LLC

(57) ABSTRACT

An electrical power distribution system for distributing electrical power from a source. The system includes one or more network circuits electrically connected to the source and one or more load devices electrically connectable to the network circuit. The system also includes one or more controllers for monitoring one or more preselected parameters of the electrical power. Each controller includes means for determining actual values of the preselected parameter, means for comparing the actual value to a preselected threshold value of the preselected parameter to determine a difference, and means for disconnecting the load device if the difference is equal to or exceeds a predetermined difference amount.

4 Claims, 22 Drawing Sheets

U.S. PATENT DOCUMENTS

| | | |
|---|---|---|
| 2009/0048718 A1 | 2/2009 | Richard et al. |
| 2009/0187499 A1 | 7/2009 | Mulder et al. |
| 2009/0198384 A1 | 8/2009 | Ahn |
| 2009/0295594 A1 | 12/2009 | Yoon |
| 2009/0326726 A1 | 12/2009 | Ippolito et al. |

FOREIGN PATENT DOCUMENTS

| | | |
|---|---|---|
| EP | 1367685 | 12/2003 |
| GB | 2309567 | 7/1997 |
| WO | WO2006037235 | 4/2006 |
| WO | PCT/CA2010/000081 | 1/2010 |

* cited by examiner

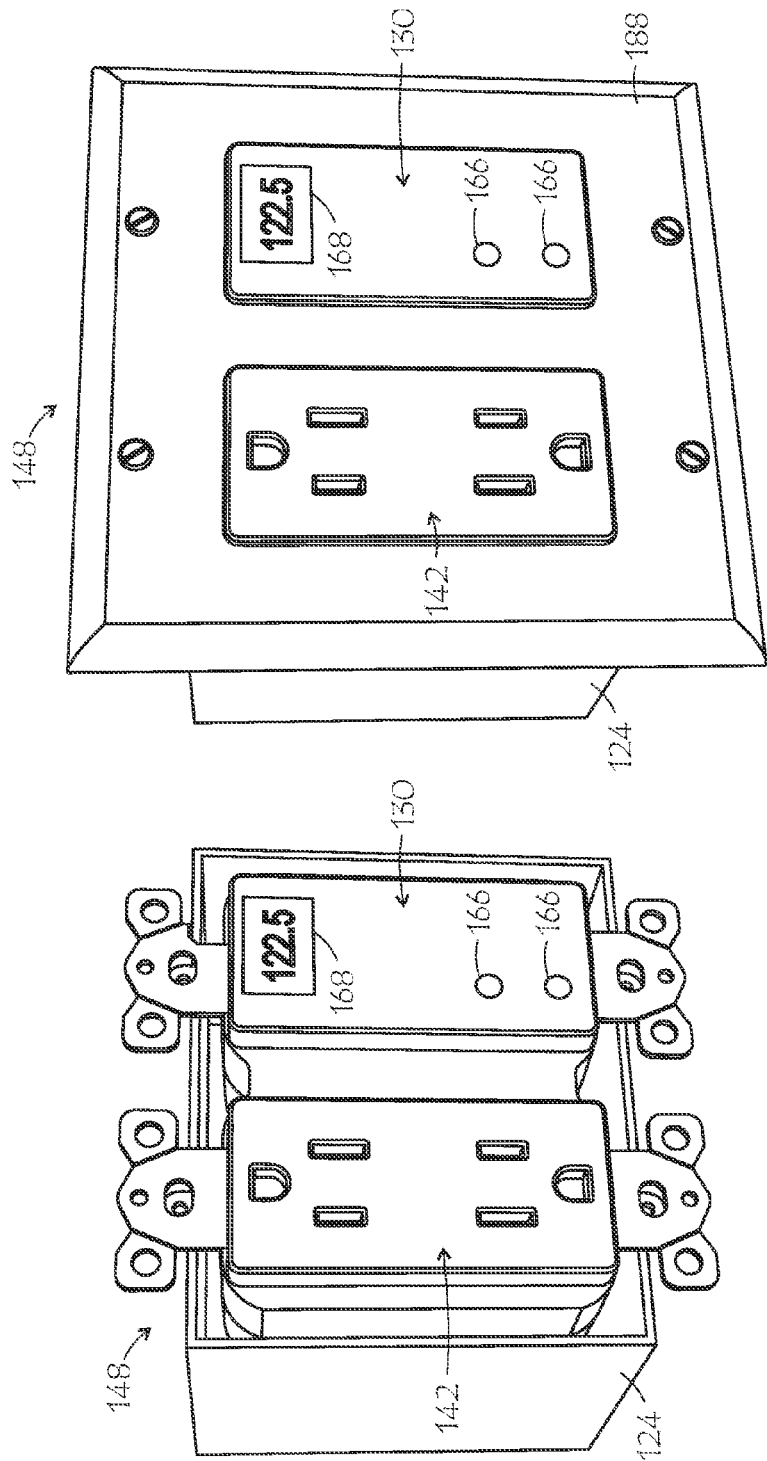

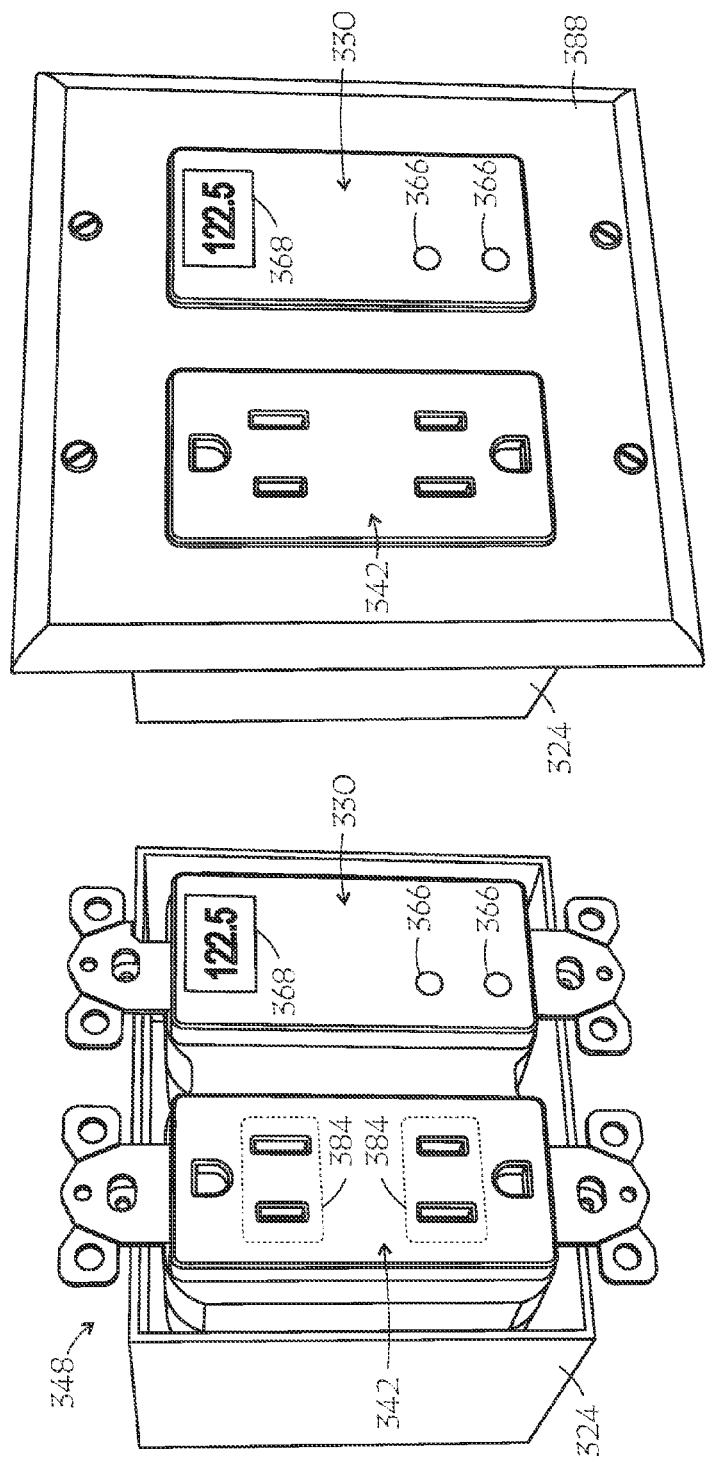

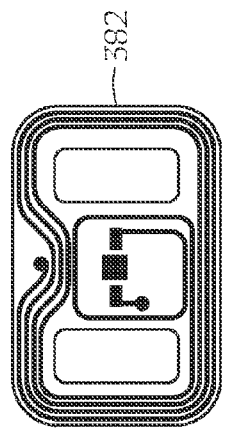
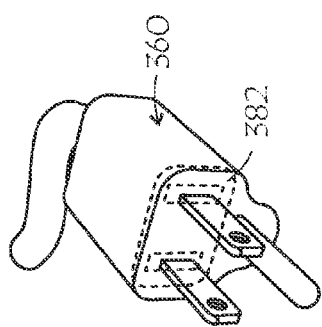
Fig.12B
Fig.12A

ELECTRICAL POWER DISTRIBUTION SYSTEM

This application claims the benefit of U.S. Provisional Application No. 61/145,604, filed Jan. 19, 2009, and incorporates such provisional application in its entirety by reference.

FIELD OF THE INVENTION

The present invention is an electrical power distribution system for distributing electrical power which includes one or more controllers for monitoring one or more preselected parameters of the electrical power.

BACKGROUND OF THE INVENTION

As is well known in the art, a supplier of electrical power generates electricity at one or more generation facilities 2, 4, and maintains an electrical grid 6 and transformer facilities 8 (FIG. 1). Typically, a local utility company operates a local distribution infrastructure 10 and associated transformer facilities 12, and delivers the electricity via a service drop 14 to a consumer's premises 16. The electricity provided to the premises 16 passes through a utility meter 18.

The total demand on the grid (and consequently on the generation facilities) varies widely over time. Ideally, the supplier should be able to meet peak demand, whenever it occurs. However, because demand varies widely, a grid and generation facilities which are constructed to meet peak demand are, by definition, overbuilt for the "average" demand. Significant costs are incurred in order for the grid and the generation facilities to be large enough to meet peak demand. If peak demand can be reduced, then the costs of building, maintaining, and operating the generation facilities and the grid can be reduced accordingly, ultimately resulting in benefits to all parties.

One approach has been to vary the costs to the consumer, depending on demand. In the past a variety of methods of assigning electrical energy pricing have been developed. Large consumers of electricity have been charged for their usage based on the peak demand, encouraging them to minimize peak demand which reduces the maximum generation capacity required in the system. Smaller consumers have been charged a fixed price per unit of usage which reflects the average cost based on typical costs and usage patterns. Recent improvements in technology have permitted the introduction of "smart" utility meters, which gather information about both the amount of energy consumption and time of consumption, i.e., the time of day when the consumption takes place. Smart meters provide the means to bill small consumers (e.g., residential consumers) a varying cost for electrical energy which more accurately reflects the true cost to generate and deliver the electricity at the time it is consumed. This development could provide an incentive for small consumers to utilize electrical energy during low-cost periods. A version of this approach is called "Time Of Use" (TOU) pricing.

Smart meters enable the residential consumer to modify consumption behavior, to minimize costs to the consumer. However, this is a cumbersome approach, in that the residential consumer must review the costs for a past period, and then make a conscious effort to modify usage patterns. Also, it does not provide the residential consumer with any way to react to dynamic, changing conditions. Additional means are needed to provide the consumer with the ability to react quickly to electricity price fluctuations (e.g., on a daily or hourly basis) and manage their consumption accordingly.

Furthermore, electrical system suppliers need effective means to dynamically reduce energy consumption at times of high demand without resorting to brownouts and blackouts.

"Demand response" systems have also been developed to limit peak demand in an electrical power grid. In one type of demand response system, the small consumer agrees to allow the supplier to disconnect load devices (e.g., the consumer's appliances and other load devices) when the grid is unable to meet all the demands made on it. Typically, the small consumer is induced to participate by appropriate incentives.

However, the known demand response systems allow the supplier to determine when load devices are to be disconnected, and may require the supplier to determine which of the small consumer's load devices are to be disconnected. This can be generally unsatisfactory for either or both of the consumer and the supplier. For example, the consumer is required to endure the inconvenience of appliances being disconnected without notice. Also, the supplier may not be willing or able to invest the time, effort or cost required to maintain records which would include the relevant details of the various load devices in many residences and businesses.

SUMMARY OF THE INVENTION

For the foregoing reasons, there is a need for an electrical power distribution system including a device for monitoring one or more preselected parameters of the electrical power and disconnecting and reconnecting load devices based on variations in the preselected parameters.

In its broad aspect, the invention provides an electrical power distribution system for distributing electrical power from a source provided by a supplier. The system includes one network circuit electrically connected to the source, one or more load devices electrically connectable to the network circuit, and one or more controllers for monitoring one or more preselected parameters of the electrical power. Each controller includes means for determining a first actual value of the preselected parameter, means for comparing the first actual value to a preselected threshold value of the preselected parameter to determine a first difference, and means for disconnecting the load device from the network circuit if the first difference is equal to or exceeds a predetermined difference amount.

In another aspect, each controller additionally includes means for electrically connecting the load device with the network circuit, when a second difference between a second actual value of the preselected parameter and the preselected threshold value is zero or less than the predetermined difference amount.

In yet another aspect, the load device includes encoded data with the preselected threshold value therefor, the controller additionally includes means for detecting the encoded data, and the controller additionally includes means for reading the encoded data comprising the preselected threshold value for the load device.

In another aspect, the invention provides an electrical power distribution system for distributing electrical power from a source provided by a supplier. The system includes one or more network circuits electrically connected to the source, a number of load devices electrically connectable to the network circuit, and one or more controllers for monitoring one or more preselected parameters of the electrical power. Each controller includes means for determining a first actual value of the preselected parameter, means for comparing the first actual value to a preselected threshold value of the preselected parameter to determine a first difference, means for disconnecting first selected ones of the load devices from the network circuit if, for any said first selected one, the first difference is equal to or exceeds a predetermined difference amount, and means for electrically connecting second selected ones of the load devices with the network circuit, when, for any said second selected one, a second difference between a second actual value of the preselected parameter and the preselected threshold value is zero or less than the predetermined difference amount.

In another of its aspects, the invention provides a method of controlling connection of one or more load devices to a supply circuit for distributing electricity. The method includes determining a first actual value of one or more preselected parameters of the electricity, and second, comparing the first actual value to a preselected threshold value of the preselected parameter to determine a first difference. Next, the first difference is compared to a predetermined difference amount. Finally, the load device is disconnected from the supply circuit if the first difference is equal to or exceeds the predetermined difference amount.

In another aspect, the method additionally includes, when at least one load device is disconnected, determining a second actual value of the preselected parameter, comparing the second actual value to the preselected threshold value to determine a second difference, and comparing the second difference to the predetermined difference amount. Finally, if the second difference is zero or less than the predetermined difference amount, the load device is reconnected to the supply circuit.

In another aspect, the method additionally includes, when at least one load device is connected, determining a second actual value of the preselected parameter, comparing the second actual value to the preselected threshold value to determine a second difference, and comparing the second difference to the predetermined difference amount. Finally, if the second difference is zero or less than the predetermined difference amount, the load device remains connected to the supply circuit.

BRIEF DESCRIPTION OF THE DRAWINGS

The invention will be better understood with reference to the drawings, in which:

FIG. 10A is an isometric view of a portion of an embodiment of an outlet assembly of the invention;

FIG. 10B is an isometric view of the outlet assembly of FIG. 10A;

FIG. 11A is an isometric view of a portion of another embodiment of an outlet assembly of the invention;

FIG. 11B is an isometric view of the outlet assembly of FIG. 11A;

FIG. 12A is an isometric view of a plug including a tag and associated with a load device;

FIG. 12B is a plan view of a tag included in the plug of FIG. 12A;

DETAILED DESCRIPTION

Figure 1:
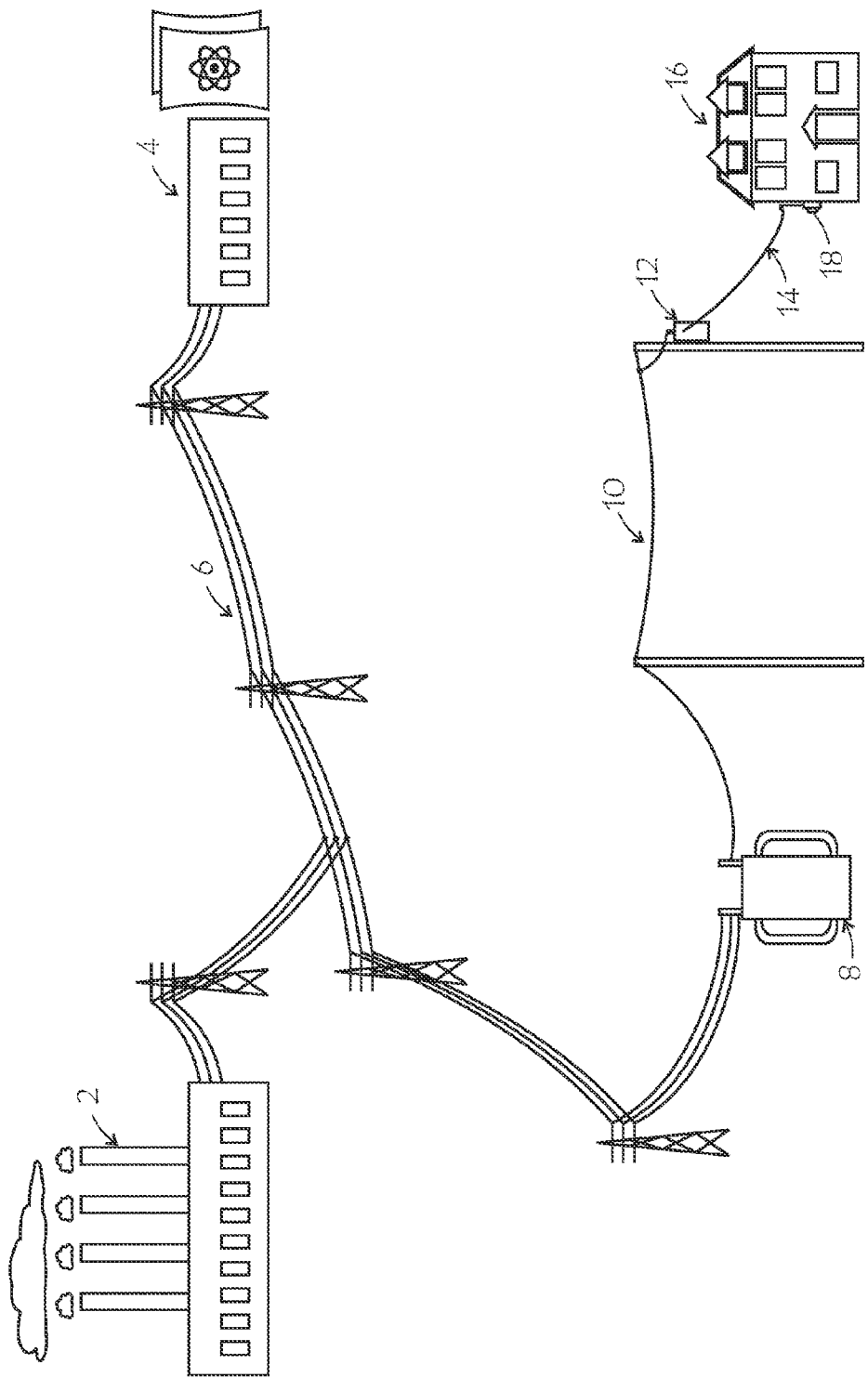
FIG. 1 (also described previously) is a schematic diagram of the electricity generation and distribution grid of the prior art.

Reference is first made to FIGS. 2-5, 10A-10B, 13A-15, and 18 to describe an embodiment of an electrical power distribution system in accordance with the invention indicated generally by the numeral 20. The electrical power distribution system 20 is for distributing electrical power from a source provided by a supplier. In one embodiment, the system 20 preferably includes one or more load devices 26 and one or more network circuits 28 electrically connected to the source. Preferably, each load device 26 is electrically connectable to one or more of the network circuits 28, as will be described. It is preferred that the system 20 also includes one or more controllers 30 for monitoring one or more preselected parameters of the electrical power, as will also be described. Preferably, each controller 30 includes means 32 for determining one or more first actual values of the preselected parameter, and means 34 for comparing the first actual value to a preselected threshold value of the preselected parameter to determine a first difference. Also, the controller 30 preferably includes means 36 for disconnecting the load device 26 from the network circuit 28 if the first difference is equal to or exceeds a predetermined difference amount.

It will be understood that, in the foregoing description, the load device is assumed to be connected, and therefore it is disconnectable if the condition therefor is met. Those skilled in the art will appreciate that, if the load device had previously been disconnected, then the result of the first difference being equal to or exceeding the predetermined difference amount is that the load device remains disconnected.

In one embodiment, the controller 30 preferably also includes means 38 for electrically connecting the load device 26 with the network circuit 28, when an additional difference between a second actual value of the preselected parameter and the preselected threshold value is zero or less than the predetermined difference amount.

It will be understood that, in the foregoing description, the load device is assumed to be disconnected initially, hence, the load device is reconnected if the condition therefor is met.

As will be described, the parameter which is preselected to be determined and compared may be one or more of a number of parameters of, or related to, the electricity. In one embodiment, the preselected parameter is a consumer cost of the electricity, i.e., the preselected parameter may be a cost per kilowatt-hour (kWh), specifically, the cost to the consumer. Alternatively, the preselected parameter may be a measurable characteristic of the electricity which may be adjusted by the supplier according to the availability of electricity (i.e., the sufficiency of the electricity available to meet the demand on the grid), e.g., voltage, frequency, harmonics, and crest factor. In addition, the preselected parameter selected may be a combination of one or more parameters of the electricity. However, in general, it is preferred that only one parameter is the preselected parameter. In one embodiment, the preselected parameter preferably is line voltage. In another embodiment, the preselected parameter preferably is a characteristic of the electrical power selected from the group consisting of voltage, frequency, harmonics, and crest factor.

In the controller of the invention, the actual value of the preselected parameter at any one time is compared to a preselected threshold value for that parameter. If the difference between the actual value and the threshold value is equal to or exceeds a predetermined difference amount, then the controller disconnects the load device(s) associated with it from the supply circuit, i.e., if the load device was connected to begin with. (If the load device is not connected to begin with, then in this situation, the load device remains disconnected.) Similarly, after disconnection, the controller determines the actual value of the preselected parameter, preferably, from time to time.

If the difference between such subsequent actual value and the threshold value is less than the predetermined difference amount, then the load device(s) associated with the controller is reconnected to the supply circuit, i.e., if the load device was disconnected to begin with. (If the load device is connected to begin with, then in this situation, the load device remains connected.) However, if the difference between such subsequent actual value and the threshold value is equal to or exceeds the predetermined difference amount, then the load device(s) remain disconnected.

Depending on the preselected parameter, the predetermined difference value may be negative or positive. In the comparison of the difference to the predetermined difference value, therefore, "exceeds" may mean either "more positive" or "more negative", depending on the situation, as is described further below. Also, "less than" may mean either "less positive" or "less negative".

As will also be described, the preselected parameter, and the preselected threshold value therefor, preferably are selected by the consumer. This enables the consumer to more selectively consume electricity, and to do so automatically based on variations of the preselected parameter which typically occur without notice to the consumer. It also has the benefit of enabling the consumer to lower the consumer's demand for electricity while minimizing inconvenience to the consumer.

Figure 2:
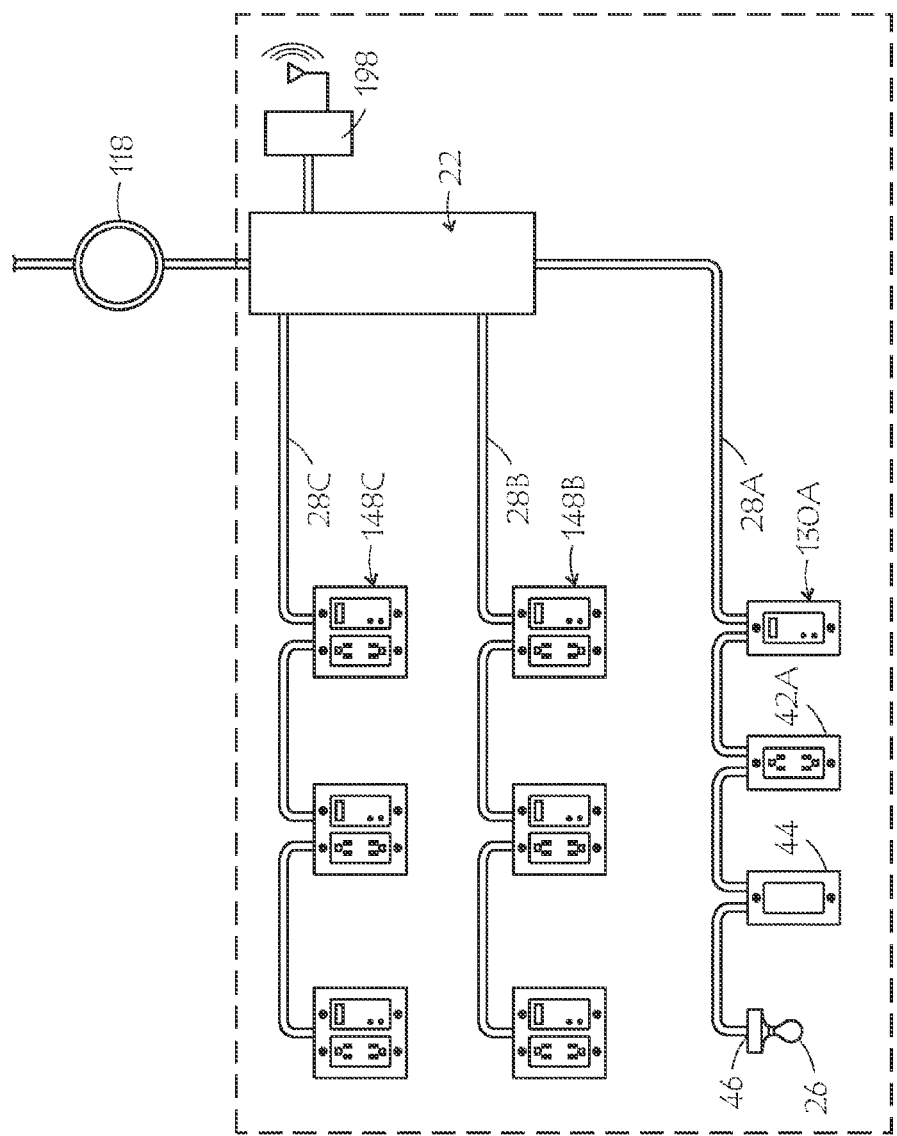
FIG. 2 is a schematic diagram of an embodiment of the electrical distribution system of the invention.

The ultimate source of the electricity is the generation facility 2, 4, as described above. In most cases, the supplier is the local utility company. The electricity is provided to the consumer's premises via the service drop 14 to the utility meter (also described above, and illustrated in FIG. 1), and subsequently to a service-entrance panel 22 (FIG. 2). As shown in FIG. 2, a number of network circuits or supply circuits 28 are connected to the service-entrance panel 22, thereby providing electricity to a number of locations throughout the premises 16. Although three circuits 28 are shown in FIG. 2 (identified as 28A-28C for convenience), it will be understood that this is exemplary only and, in most residential premises, a larger number of supply circuits 28 are usually required. Typically, the service-entrance panel 22 includes circuit breakers or fuses, as is known.

In FIG. 2, the controller 30 is shown attached to the supply circuit 28A. Also connected to the supply circuit 28A are a receptacle 42A, the load device 26A, and the switch 44 for connecting and disconnecting the load device 26A to the supply circuit 28A. Preferably, the network circuit 28 also includes one or more wiring terminals at which the load device 26 is electrically connectable, i.e., in a "permanent" connection.

For the purposes hereof, a "load device" is any device which consumes electrical power, which may be temporarily or non-temporarily connected to a supply circuit. For illustrative purposes, the load device 26A is attached to the supply circuit 28A at a wiring terminal 46, i.e., the load device 26A is permanently attached to the supply circuit 28A.

Additional elements and embodiments are described below. Additional elements and embodiments are numbered so as to correspond to like elements to which reference numerals have been given.

Figure 3:
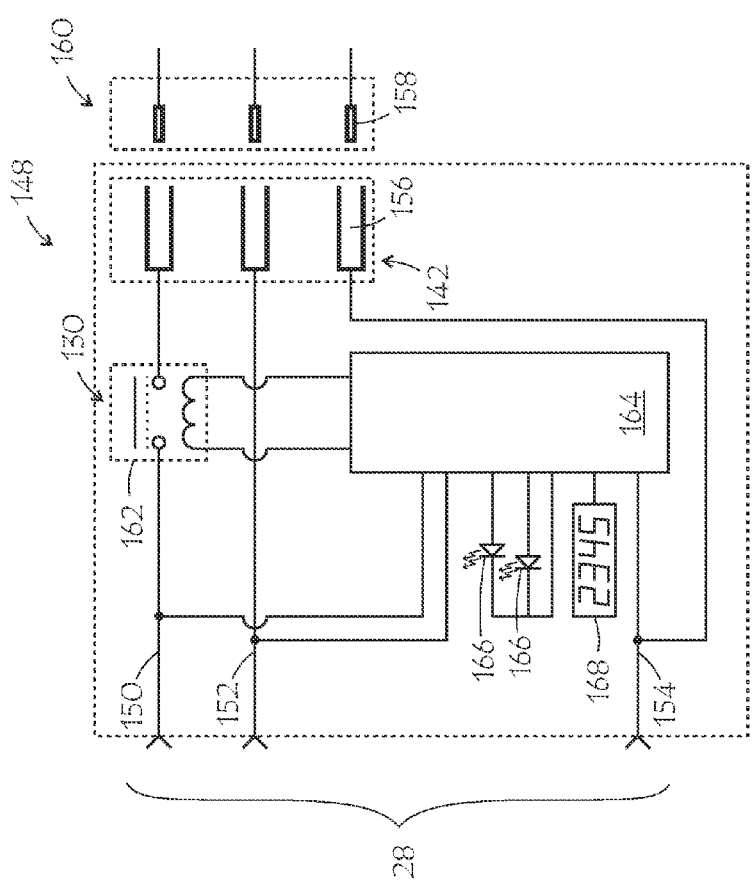
FIG. 3 is a block diagram of an embodiment of a controller of the invention.
Figure 4:
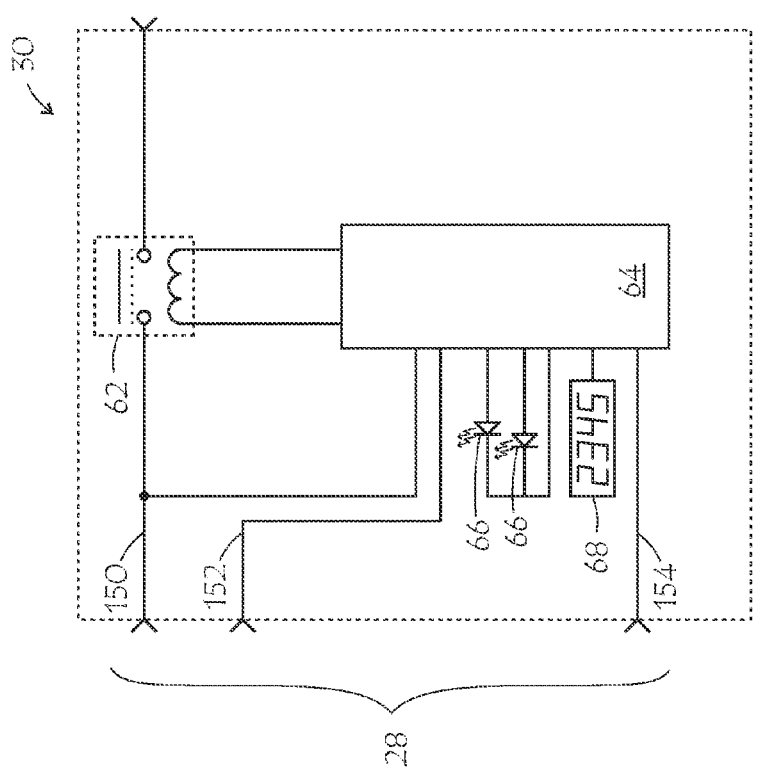
FIG. 4 is a block diagram of another embodiment of the controller of the invention.

Those skilled in the art will appreciate that the load device 26 may be permanently connected to the supply circuit, as indicated above, or alternatively, the load device 26 may be temporarily connected to the supply circuit, i.e., via the receptacle 42. For the purposes hereof, a "temporary" load device means a load device connected to a supply circuit in a manner intended to be temporary, e.g., when a plug is inserted into a receptacle, and a "non-temporary" load device means a load device connected to a supply circuit in a manner intended to be permanent, e.g., a light fixture mounted to a wall or ceiling and connected by conductors to the supply circuit. In one embodiment, the network circuit 28 preferably includes one or more receptacles 42 to which the load device 26 is electrically connectable. As will be described, the invention herein also includes an outlet assembly 148 in which the controller 130 is coupled with one or more receptacles 142 so that the receptacle 142 is connected and disconnected from the network circuit 28 by the controller 130 (FIG. 3). For illustrative purposes, two of the network circuits are identified as 28B and 28C, and the outlet assemblies connected to them are identified as 148B and 148C respectively.

An embodiment of the outlet assembly 148 is shown in detail in FIG. 3. The supply circuit 28 includes live, neutral, and ground conductors 150, 152, 154. The receptacle 142 includes holes 156 in which the prongs 158 of a plug 160 associated with the load device (not shown in FIG. 3) are receivable. The controller 130 preferably includes a relay 162 for connecting and disconnecting the live conductor 150, and also preferably includes a control circuit 164, as will be described. Preferably, the outlet assembly 148 additionally includes indicators 166 (preferably, LEDs), and a display 168, as will also be described.

Figure 5:
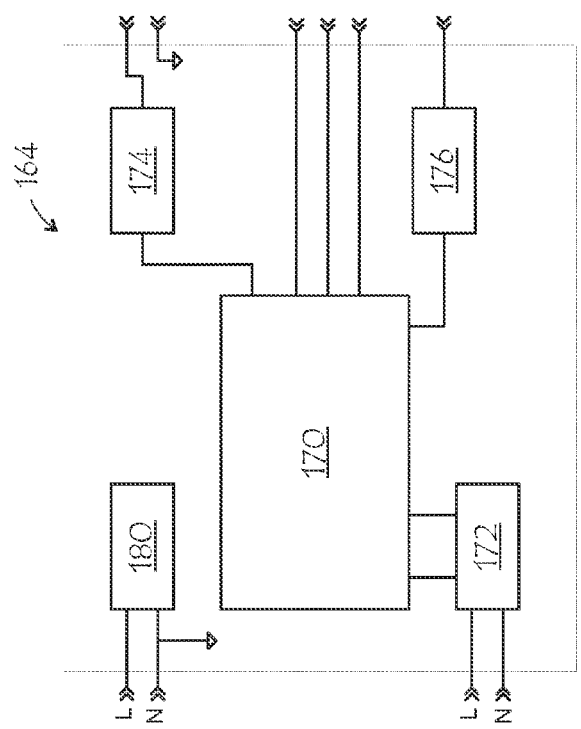
FIG. 5 is a block diagram of an embodiment of a control circuit of the invention.

The control circuit 164 is schematically illustrated in FIG. 5. It will be understood that the control circuit 164 may be implemented in various ways, as is known by those skilled in the art. For example, the signal measurement, computation, comparison, and timing functions may be implemented using entirely analog circuits, a combination of analog and discrete digital circuits, or with analog circuits and a general purpose microprocessor with suitable software. Preferably, and as illustrated in FIG. 5, the control circuit 164 includes a microprocessor 170 containing suitable software, analog signal conditioning circuits 172 presenting prepared signals to analog inputs of the microprocessor 170, and a relay driver circuit 174 controlled by the microprocessor 170. The control circuit 164 preferably also includes a power supply circuit 180. Where the outlet assembly 148 includes the display 168, then the control circuit 164 preferably also includes a display driver circuit 176 controlled by the microprocessor 170. Where the outlet assembly 148 includes the indicators 166, then the control circuit 164 preferably also includes indicator driver circuits incorporated into the microprocessor 170.

For exemplary purposes only, the relay 162 is shown in FIGS. 3 and 5 as a single pole relay with appropriate driver circuitry switching the live conductor, but any suitable switching device could be used. Also, it will be understood that, instead of switching the live conductor only, both the live and neutral conductors could be switched.

An embodiment of the outlet assembly 148 is shown in FIGS. 10A and 10B. As can be seen in FIG. 10A, the outlet assembly 148 preferably includes a conventional box 124 in which the receptacle 142 and the controller 130 are positioned. (It will be understood that the receptacle 142 and the controller 130 are connected as shown in FIG. 3, although such connections are not shown in FIG. 10A.) The complete outlet assembly 148 is shown in FIG. 10B, in which a conventional cover plate 188 is positioned on, and attached to, the box 124. As can be seen in FIGS. 10A and 10B, when the outlet assembly is installed, the display 168 and the indicators 166 are visible to the user. The display 168 preferably is used to display the current actual value of the preselected parameter, or may be used to display messages to indicate current status. The indicators 166 preferably indicate current status, e.g., to confirm to the user that the controller and the receptacle are functioning normally, or to indicate otherwise, as the case may be.

It will be understood that any number of receptacles may be included in the outlet assembly. For example, as illustrated, the receptacle 142 includes two receptacles, each controlled by a relay therefor. The selective electricity utilization controller functionality can be incorporated with devices (e.g., receptacles) having other functionalities, such as overload fault interrupter, power fault interrupter, shock fault interrupter, ground fault interrupter, arc fault interrupter, and various non-protective functions such as home automation control and communication functions.

As indicated above, the controller 30 may be used to disconnect and reconnect a "non-temporary" load device. An embodiment of the controller 30 is shown in detail in FIG. 4. The supply circuit 28 includes live, neutral, and ground conductors 150, 152, 154. The controller 30 preferably includes a relay 62 for connecting and disconnecting the live conductor 150 and a connectable circuit 90 (i.e., the circuit 90 being for providing an electrical connection to the non-temporary load device), and also preferably includes a control circuit 64. The controller 30 preferably is included with a switch (e.g., a light switch) for operating the load device. Preferably, the controller 30 additionally includes indicators 66 (preferably, LEDs), and a display 68.

The control circuit 64 is identical in all material respects to the control circuit 164. Accordingly, further description of the control circuit 64 is not required.

Figure 13A:
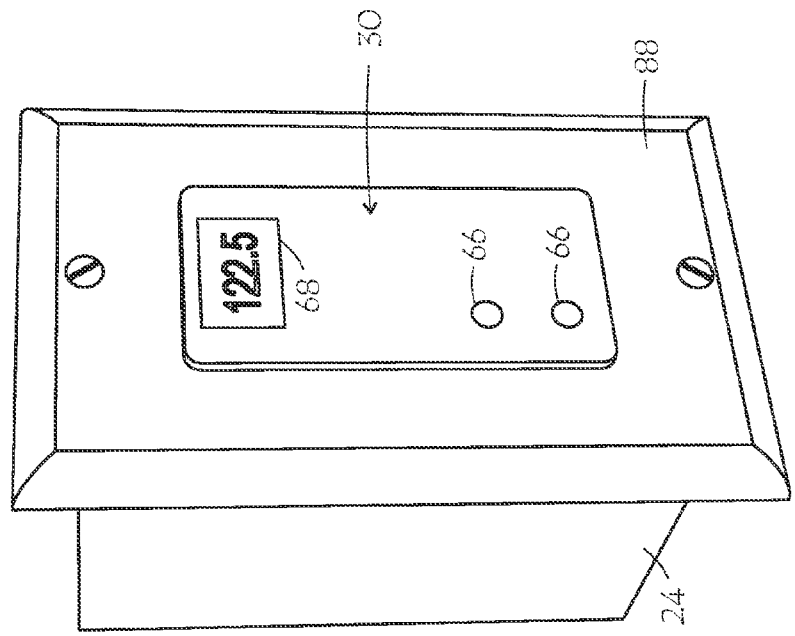
FIG. 13A is an isometric view of a portion of another embodiment of the controller of the invention.
Figure 13B:
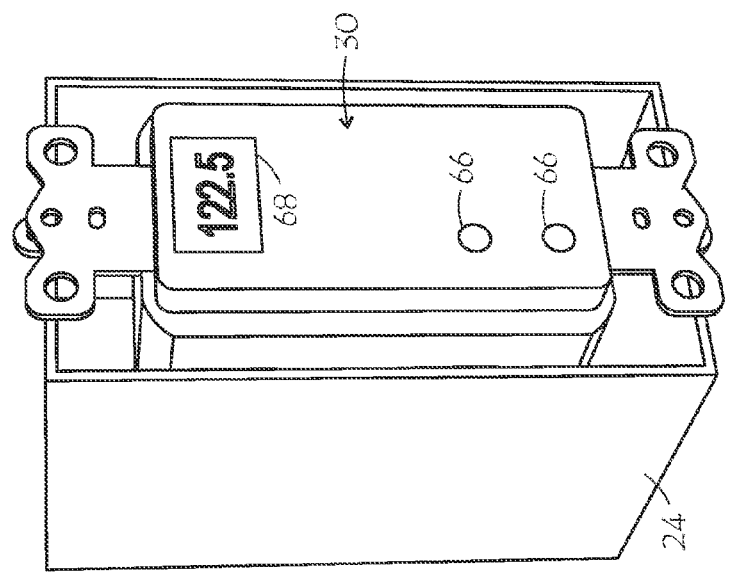
FIG. 13B is an isometric view of the controller of FIG. 13A.

As can be seen in FIGS. 13A and 13B, the controller 30 preferably is positioned in a conventional box 24 to which a conventional face plate 88 is attached. The display 68 and the indicators 66 are viewable once the controller 30 is installed, to provide status information to the user.

It will be appreciated by those skilled in the art that the controller functionality can be incorporated into load devices, whether temporarily or non-temporarily connected. In addition, however, the controller of the invention can be adapted to control a number of load devices.

Figure 14A:
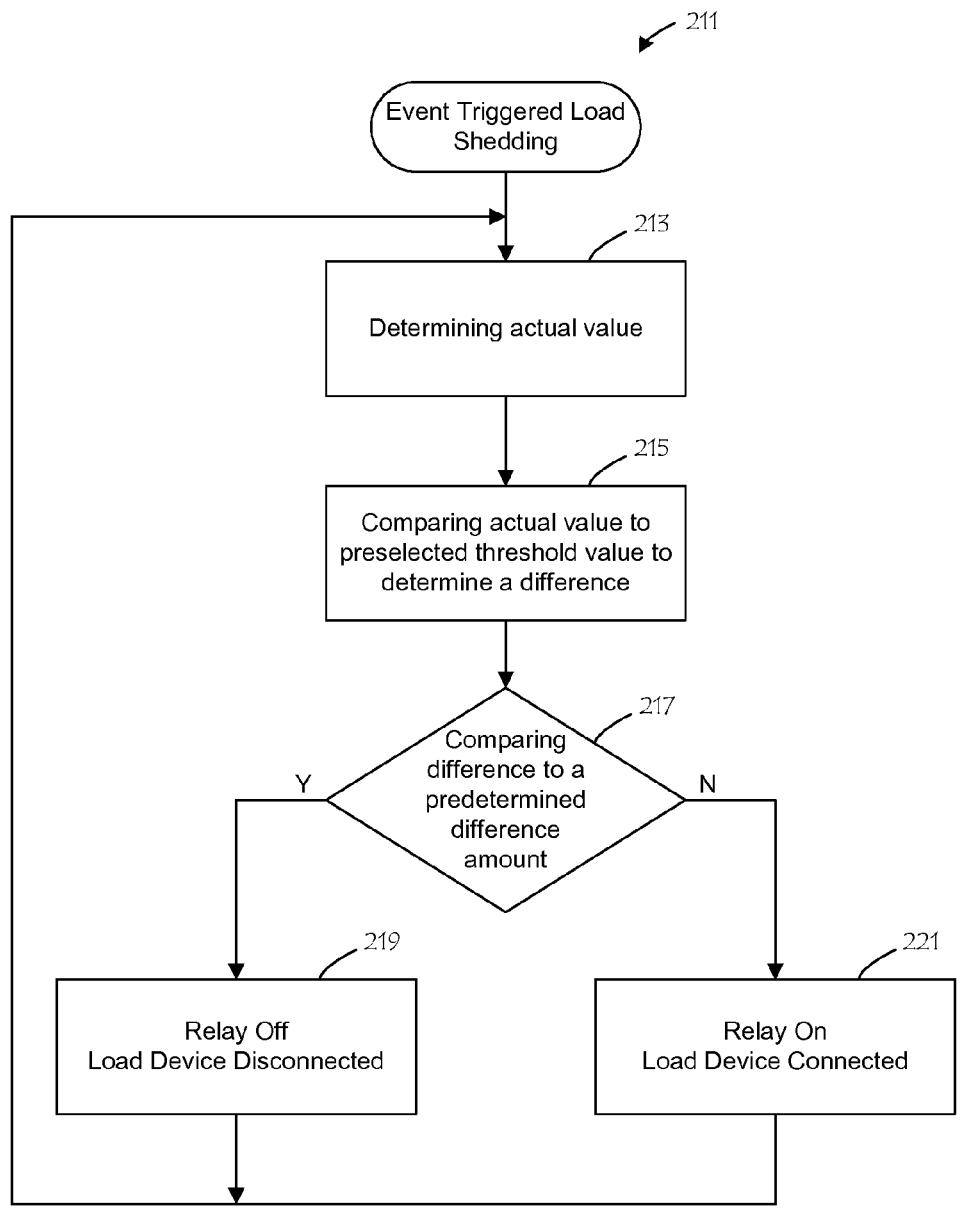
FIG. 14A is a flow chart schematically illustrating an embodiment of a method of the invention.

FIG. 14A illustrates an embodiment of a method 211 of the invention of the operation of the outlet assembly 148 through a flow chart. In use, the method 211 begins at step 213, where the actual value of one or more preselected parameters of the electricity is determined (FIG. 14A). For example, if the preselected parameter is cost, then the controller determines the actual cost of the electricity at a particular time. For the purposes of discussion, it is here assumed that the actual cost is $0.10 per kWh.

In the next step (step 215), the actual value (in this example, $0.10 per kWh) is compared to a preselected threshold value. For the purposes of discussion, it is here assumed that the preselected threshold value is $0.04 per kWh. Therefore, the difference is +$0.06 per kWh.

The difference is then compared to a predetermined difference amount. Where the preselected parameter is cost, then the predetermined difference amount may be, for example, +$0.01 per kWh. This means that a difference of less than that amount (e.g., +$0.005 per kWh) is not sufficient to result in disconnection. However, the difference may be zero, or a negative number. A difference of zero, or a negative difference, does not result in disconnection of the load device. It will be understood that the predetermined difference amount is set by the consumer, and varies depending, among other things, on the parameter(s) of the electricity which the consumer has selected.

In this situation, it is assumed for discussion purposes that the predetermined difference amount is +$0.01 per kWh. Accordingly, the difference (+$0.06 per kWh) is found to be equal to or greater than the predetermined difference amount (+$0.01 per kWh) (step 217) and in step 219 the relay is actuated to disconnect the load device(s) from the supply circuit.

However, if the actual value were instead determined in step 213 to be $0.03 per kWh, then the difference would be determined in step 215 to be −$0.01 per kWh. In step 217, such difference (−$0.01 per kWh) would be determined to be less than the predetermined difference amount. In this situation, if the load device is connected to the supply circuit, then it would remain connected (step 221).

However, if the load device had previously been disconnected, then in this situation, in view of the additional actual value (i.e., $0.03 per kWh), the difference is less than the predetermined difference amount, and the load device is reconnected (step 221).

As described above, the difference between the actual value and the preselected threshold value is required to exceed or be equal to the "predetermined difference amount" before a disconnection takes place. Similarly, for a disconnected load device, the difference between the actual value and the preselected threshold value is required to be less that the predetermined difference amount. This is intended to allow the consumer to select a predetermined difference amount which is relatively large in order to ensure that disconnections, and reconnections, do not take place where the difference between the actual value and the preselected threshold value is relatively small.

For example, if the preselected threshold value is $0.04 per kWh, then the consumer may set the predetermined difference amount at $0.01 per kWh. In a jurisdiction where the consumer's cost is varied in tenths of a cent (i.e., $0.001 per kWh), this means that, if the consumer cost is, e.g., $0.039 per kWh, then the disconnection would not take place at that cost. In this example, it can be seen that the predetermined difference amount may be set by the consumer at such level as the consumer prefers. For instance, the consumer may instead set the predetermined difference amount at $0.005 per kWh.

It will also be noted that the difference can be zero. For a particular parameter, the amount of the difference is not an absolute value, i.e., a decrease in the cost of $0.01 per kWh in the example noted above does not have the same consequence as an increase in the cost of $0.01 per kWh. However, depending on the parameter selected, the calculations may differ.

In this situation, "exceeds" is understood to mean "more positive", and "less than" means "less positive". This is because the triggering event is, in effect, an actual cost which is higher than a predetermined threshold value. For instance, if the predetermined threshold value is $0.04 per kWh and the actual value is $0.06 per kWh, then the difference is +$0.02 per kWh. If the predetermined difference amount is +$0.01 per kWh, then the difference exceeds the predetermined difference amount, and the load device, if at first connected, is disconnected. However, if the actual cost is $0.045 per kWh, then the difference is +$0.005 per kWh. In this situation, the difference is less than the predetermined difference amount, and the load device is connected. In connection with cost data, the predetermine difference amount is a positive number.

However, if the preselected parameter is voltage, then the consumer may choose that the preselected threshold value is 106 volts. In this situation, the rated voltage is 120 volts. In this situation, "exceeds" is understood to mean "more negative", and "less than" means "less negative". This is because the triggering event is, in effect, a line voltage lower than a predetermined threshold value. For instance, if the actual voltage is 104 volts, then the difference between the actual value and the preselected threshold value is −2V (i.e., 104V−106V). In this situation, if the predetermined difference amount is assumed to be −1V, then the difference exceeds the predetermine difference amount, and the load device, if first connected, is disconnected.

As another example, if the actual voltage is instead 106 volts, then the difference between the actual value and the preselected threshold value is zero. This is equal to the predetermined difference amount of −1V, and so in this situation, the load device would (if first connected) be disconnected.

However, if the line voltage is 107 volts, then the difference between the actual value and the preselected threshold value is +1V (i.e., 107V−106V). In this situation, the difference of +1V is considered to be less than the predetermined difference amount of −1V (i.e., the difference is less negative than the predetermined difference amount), and the load device, if disconnected to begin with, is reconnected, and otherwise remains connected. In connection with voltage data, the predetermined difference amount is a negative number.

It is preferred that, when the load device is connected, the controller determines the first actual value, and compares the first actual value to the preselected threshold value, at first preselected time intervals. A suitable first preselected time interval is approximately 10 seconds.

In addition, after disconnection of the load device from the network circuit 28, the controller determines the second actual value, and compares the second actual value to the preselected threshold value, at second preselected intervals. A suitable second preselected time interval is approximately 30 seconds.

Figure 14B:
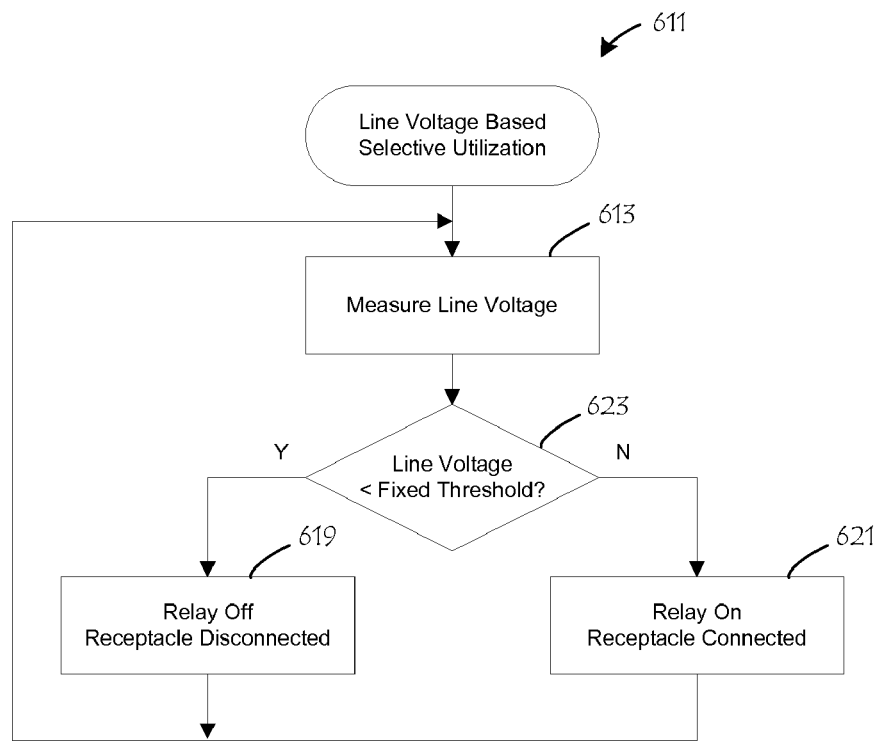
FIG. 14B is a flow chart schematically illustrating another embodiment of a method of the invention.

It will be appreciated by those skilled in the art that the method of the invention may, if preferred, exclude the step of comparing the difference (i.e., between the actual value of the preselected parameter and the preselected threshold value) and the predetermined difference amount. Such a method 611 is illustrated in FIG. 14B. In the method 611, the preselected parameter of the electricity is line voltage.

As can be seen in FIG. 14B, in the method 611, the first step is to measure line voltage (i.e., to determine the actual value of the preselected parameter) (step 613). In the next step, it is determined whether the line voltage is less than a fixed threshold (step 623). If it is, then the load device is disconnected (step 619). If it is not, then the load device is not disconnected (step 621).

It will be understood that the foregoing describes the consequences where the load device is connected when the method 611 is commenced. Where the load device is disconnected when the method 611 is commenced, then in step 621, the load device is reconnected, and in step 619, the load device simply remains disconnected. As indicated above, the method is repeated at suitable time intervals.

Figure 18:
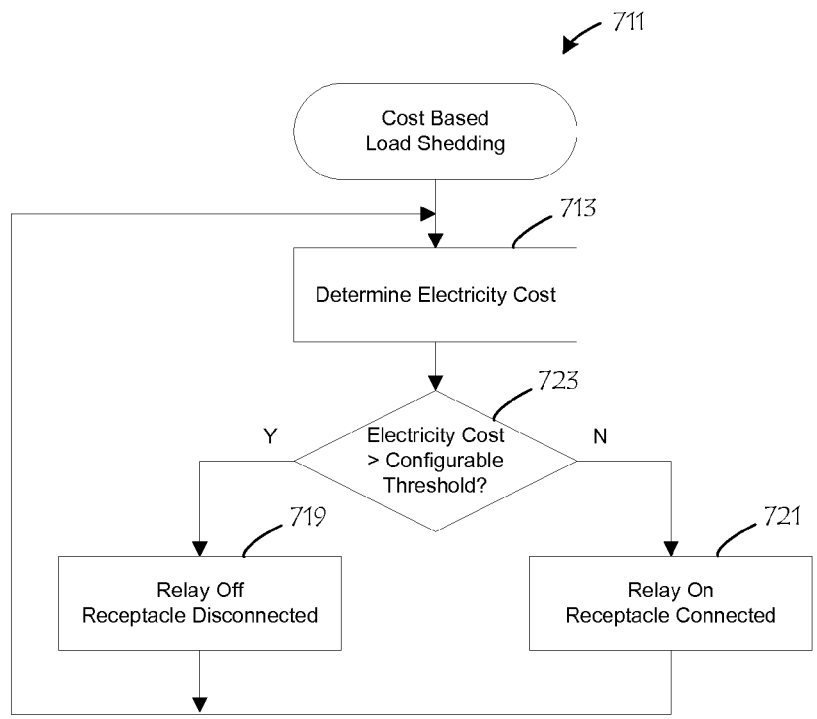
FIG. 18 is a flow chart schematically illustrating another embodiment of a method of the invention.

Another embodiment of a method 711 of the invention is illustrated in FIG. 18. In the method 711, the preselected parameter is the consumer's cost of the electricity, but the method 711 otherwise includes steps which generally correspond to the steps of the method 611.

In the method 711, the first step is to determine the actual cost (FIG. 18, step 713). In the next step, the actual cost is compared to the preselected threshold value (step 723). If the actual cost is greater than the preselected threshold value, then—assuming that the load device is connected—the load device is then disconnected (step 719). (In this situation, if the load device was disconnected when the first step (step 713) took place, then the load device remains disconnected.)

If the actual cost is not greater than the preselected threshold value, then—assuming that the load device is connected when the first step (step 713) takes place—the load device remains connected (step 721). (In this situation, if the load device is disconnected when the first step (step 713) takes place, then the load device is reconnected at step 721.)

In one embodiment, the preselected threshold value preferably is configurable. It will be appreciated by those skilled in the art that such configuration may be effected by the consumer via a variety of means which are well known in the art. For example, the threshold value may be set via an input device and a user interface at the outlet or a central controller, or via an internet interface or by a remote computer interface, e.g., via keypad or by setting configuration switches. The consumer preferably is able to change the preselected parameter and/or the preselected threshold value therefore relatively easily. So, for example, if the consumer has selected cost to be the parameter to be determined and compared, the consumer may change the preselected threshold value, i.e., to take changing costs or other conditions into account.

However, those skilled in the art will appreciate that, as a practical matter, the preselected threshold values for certain preselected parameters preferably are fixed. For example, the preselected threshold value for voltage provided to a particular load device should not be less than the minimum voltage at which that load device is safely operable, without any potentially damaging or dangerous consequences. For this reason, the preselected threshold value for the voltage supplied to a particular load device may be "fixed", i.e., set in such a manner that the consumer cannot (or at least, cannot easily) amend the preselected threshold value. For instance, in FIG. 14B (illustrating the method 611), the preselected threshold value is described as "fixed".

Alternatively, in addition to a fixed voltage predetermined threshold value, the consumer may configure a second voltage predetermined threshold value. In this situation, the fixed threshold value is the minimum voltage required for safe and non-damaging operation (e.g., 106 volts), and the configured threshold is a higher voltage. For instance, the consumer may prefer to configure a higher threshold voltage in order to ensure that, over a long period of time, the load device is not damaged.

Figure 15:
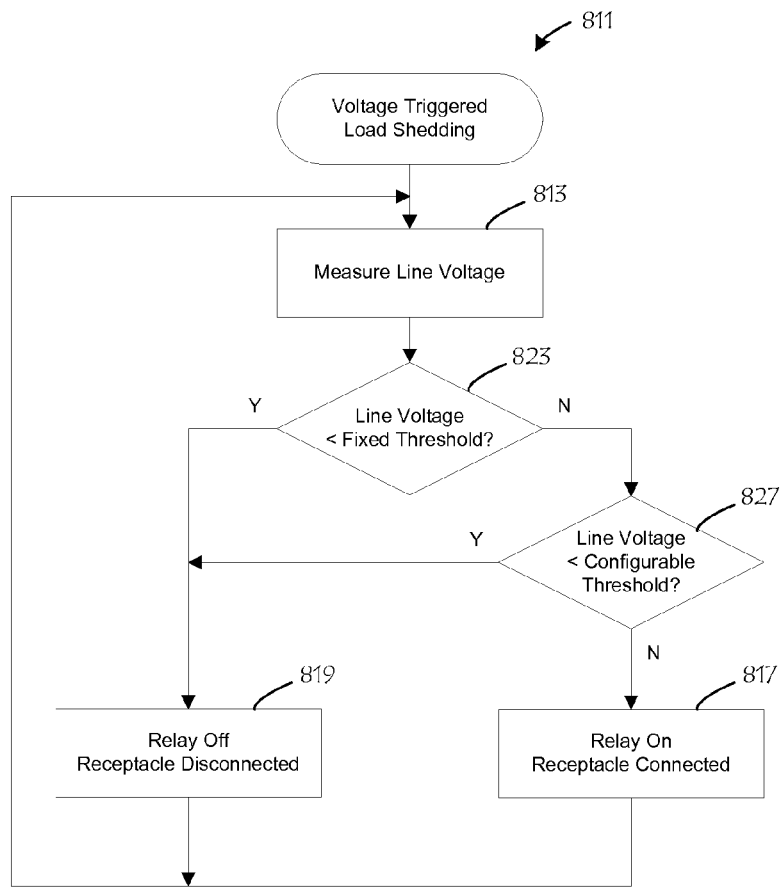
FIG. 15 is a flow chart schematically illustrating another embodiment of a method of the invention.

In FIG. 15, an embodiment of the method 811 of the invention is illustrated. First it is assumed that the load device is connected. In the first step 813, the line voltage is determined. In the next step, it is determined whether the line voltage is less than the fixed threshold (step 823). If it is, then in the next step (step 819), the load device is disconnected. However, if it is not, then in the next step, the line voltage is compared to the configured threshold. If the line voltage is less than the configurable threshold, then the load device is disconnected (step 819). On the other hand, if the line voltage is not less than the configurable threshold, then the load device is not disconnected (step 817).

It will be appreciated by those skilled in the art that, although step 823 is shown as preceding step 827 in FIG. 15, the order in which those steps are performed (i.e., the sequence of the steps) is not functionally significant, i.e., step 827 could precede step 823. Those skilled in the art will also appreciate that the controller may be adapted to perform only one of steps 823 and 827, because such steps are functionally independent of each other. One such adaptation is illustrated in FIG. 14B, in which the method illustrated excludes the steps related to a configurable threshold.

The invention also allows the consumer to assign priorities to load devices respectively. This can be achieved by the consumer selecting different preselected threshold values for the load devices respectively, depending on the relative importance of keeping the respective load devices connected, such importance being determined according to objective and/or subjective factors, as the case may be.

For example, if the preselected parameter is cost, the consumer may choose to have the low priority load devices disconnected when the cost of electricity is greater than $0.04 per kWh. The consumer may choose to have "medium" priority load devices disconnected when the cost of electricity is greater than, for example, $0.08 per kWh. Finally, the consumer may choose to have certain load devices given the highest priority, meaning that such load devices are not to be disconnected automatically, regardless of the cost of electricity. For these load devices, the preselected threshold value may be set at a very high number, or infinity. This last choice may be made, in practice, where for instance the load device is required to remain operational in order to maintain a person's life. Those skilled in the art will appreciate that a variety of settings may be chosen by the consumer, so that priorities are not necessarily limited to high, medium, and low. In addition, the consumer may change the preselected threshold values for any of the load devices from time to time, thereby affecting the relative priorities between them. It will be understood that the foregoing is only an example of the way in which different threshold values may be selected by the consumer to enable the consumer to be more selective in the consumer's utilization of electricity.

For example, if the preselected parameter is "Demand Response" or energy savings priority, the priority level of each load device may be assigned. For example, a piece of electrical life-support equipment, such as an oxygen pump, may have a priority 1 meaning that it should never be shut off during any Demand Response event. A food refrigeration appliance may have priority 2 meaning that it should only be shut off in critical load shedding situations. Cooking or entertainment equipment may have a priority 3 meaning that they should only be shut off in important load shedding situations. Other equipment, such as a pool pump or a lamp, may have a priority 4 or priority 5 meaning that they can be shut off during general load shedding situations, such as to reduce utility company peak demand or to reduce consumer energy bills. The priority level of each load device can be stored in either a central accessible database, in the outlet associated with the load device or in the load device data tag. If a Demand Response or energy savings level event is issued by either the utility company or by another energy management system, then the system shall turn off all devices with greater priority level. For example, if a level 1 event occurs, then all level 2, 3, 4 and 5 devices turn off since the difference between the event level and the device level is greater than zero.

It will be appreciated by those skilled in the art that, in one embodiment, the method of the invention preferably excludes the step of comparing the difference (i.e., between the actual value of the preselected parameter and the preselected threshold value) and the predetermined difference amount. In this embodiment, the disconnection takes place if the actual value is greater than or less than (as the case may be) the preselected threshold value. Similarly, connection takes place if the actual value is less than or greater than (as the case may be) the preselected threshold value.

Figure 7:
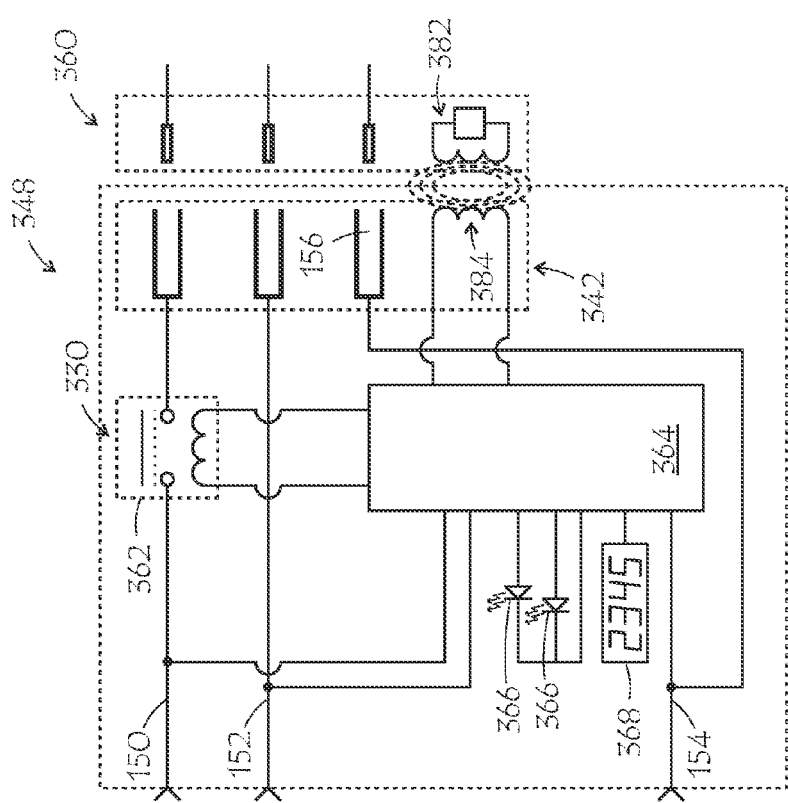
FIG. 7 is a block diagram of another embodiment of the controller of the invention.

For instance, in one embodiment, the system 320 includes one or more load devices 326 including a tag 382 (FIGS. 12A, 12B) with data including the preselected threshold value therefor. The tag 382 preferably is a PCD tag, i.e., a proximity-coupled device containing data that can provide access to the data to a PCD reader, when the tag and the reader are in close proximity. The PCD reader is a proximity-coupled device or circuit that can read and/or write data from/to the PCD tag. The system 320 also preferably includes a controller 330 which includes means for detecting the tag 382 and reading the data therein, i.e., the PCD reader 384 (FIG. 7). PCD tags having data associated therewith and readable by PCD readers are described in U.S. application Ser. No. 11/242,878, filed on Oct. 5, 2005, the entire contents of which application are hereby incorporated by reference.

Accordingly, in one embodiment, the load device 326 preferably includes encoded data including the preselected threshold value, and the controller 330 preferably also includes means for detecting the encoded data with the preselected threshold value for the load device. The controller 330 preferably also includes means for reading the encoded data.

The encoded data preferably includes an identifier, for identification of the load device associated with the tag. In addition, the encoded data preferably includes one or more preselected threshold values, i.e., for one or more preselected parameters for the load device. The encoded preselected threshold value(s) may be selectable and configurable, or they may be fixed.

An embodiment of an outlet assembly 348 is shown in detail in FIG. 7. The outlet assembly 348 preferably includes the controller 330 and one or more receptacles 342. The supply circuit 28 includes live, neutral, and ground conductors 150, 152, 154. The receptacle 342 preferably includes holes 156 in which the prongs 158 of a plug 360 associated with the load device (not shown in FIG. 7) are receivable. The controller 330 preferably includes a relay 362 for connecting and disconnecting the live conductor 150, and also preferably includes a control circuit 364, as will be described. Preferably, the outlet assembly 148 additionally includes indicators 366 (preferably, LEDs), and a display 368, as will also be described. The controller 330 also preferably includes the PCD reader 384.

Figure 8:
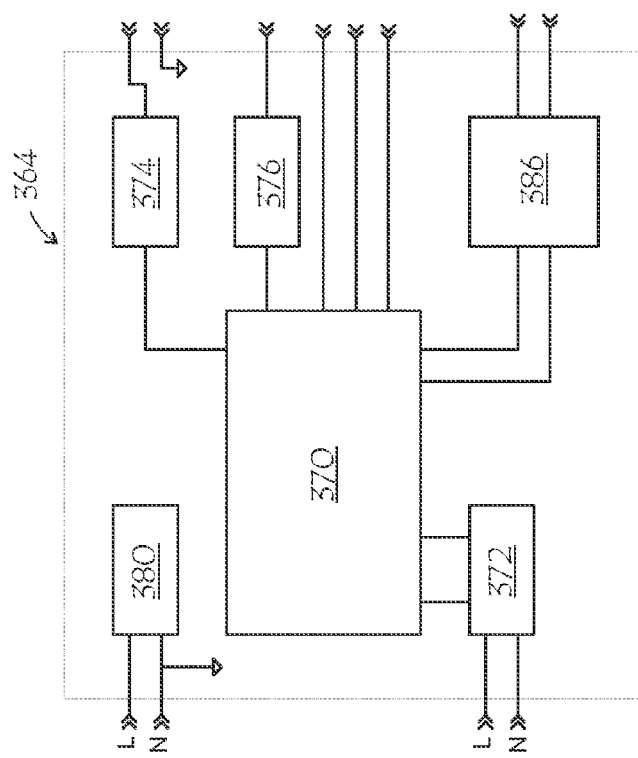
FIG. 8 is a block diagram of another embodiment of a control circuit of the invention.

The control circuit 364 is schematically illustrated in FIG. 8. It will be understood that the control circuit 364 may be implemented in various ways, as is known by those skilled in the art. For example, the signal measurement, computation, comparison, and timing functions may be implemented using entirely analog circuits, a combination of analog and discrete digital circuits, or with analog circuits and a general purpose microprocessor with suitable software. Preferably, and as illustrated in FIG. 8, the control circuit 364 includes a microprocessor 370 containing suitable software, analog signal conditioning circuits 372 presenting prepared signals to analog inputs of the microprocessor 370, and a relay driver circuit 374 controlled by the microprocessor 370. The control circuit 364 preferably also includes a power supply circuit 380. Where the outlet assembly 348 includes the display 368, then the control circuit 364 preferably also includes a display driver circuit 376 controlled by the microprocessor 370. Where the outlet assembly 348 includes the indicators 366, then the control circuit 364 preferably also includes indicator driver circuits incorporated into the microprocessor 370. The control circuit 364 preferably also includes an encoded plug reader circuit 386. In one embodiment, actual cost data (or other such data) is provided to the controller 330 via power-line communication, i.e., communication signal(s) modulated on the 120V supply lines.

An embodiment of the outlet assembly 348 is shown in FIGS. 11A and 11B. As can be seen in FIG. 11A, the outlet assembly 348 preferably includes a conventional box 324 in which the receptacle 342 and the controller 330 are positioned. (It will be understood that the receptacle 342 and the controller 330 are connected as shown in FIG. 7, although such connections are not shown in FIG. 11A.) The complete outlet assembly 348 is shown in FIG. 11B, in which a conventional cover plate 388 is positioned on, and attached to, the box 324. As can be seen in FIGS. 11A and 11B, when the outlet assembly is installed, the display 368 and the indicators 366 are visible to the user. The display 368 preferably is used to display the current actual value of the preselected parameter, or may be used to display messages to indicate current status. The indicators 366 preferably indicate current status, e.g., to confirm to the user that the controller and the receptacle are functioning normally, or to indicate otherwise, as the case may be.

It will be understood that any number of receptacles may be included in the outlet assembly. For example, as illustrated, the receptacle 342 includes two receptacles, each controlled by a relay therefor. The selective electricity utilization controller functionality can be incorporated with devices (e.g., receptacles) having other functionalities, such as overload fault interrupter, power fault interrupter, shock fault interrupter, ground fault interrupter, arc fault interrupter, and various non-protective functions such as home automation control and communication functions.

The plug 360 is shown in FIG. 12A, with the tag 382 (in ghost outline) indicated. The tag 382 is also shown in FIG. 12B.

It will be appreciated by those skilled in the art that, although PCD tags are conveniently located in the plugs of load devices, PCT tags may be positioned in or on the load device in various ways. The use of PCD tags and PCD readers enables the consumer to set a preselected threshold value for a particular load device which will be read, as long as the load device is plugged into an outlet assembly 348 which includes the controller 330 with the PCD reader.

For example, the consumer may choose that the preselected parameter for a particular load device is the cost of electricity, and the consumer may also choose that the load device has a preselected threshold value of $0.04 per kWh. Where the system 320 includes a number of outlet assemblies in the premises at different locations (e.g., as indicated in FIG. 2), then the load device 326 will operate subject to the selected limits, even if the load device 326 is moved from time to time for connections with different outlet assemblies at different locations in the premises.

Figure 16:
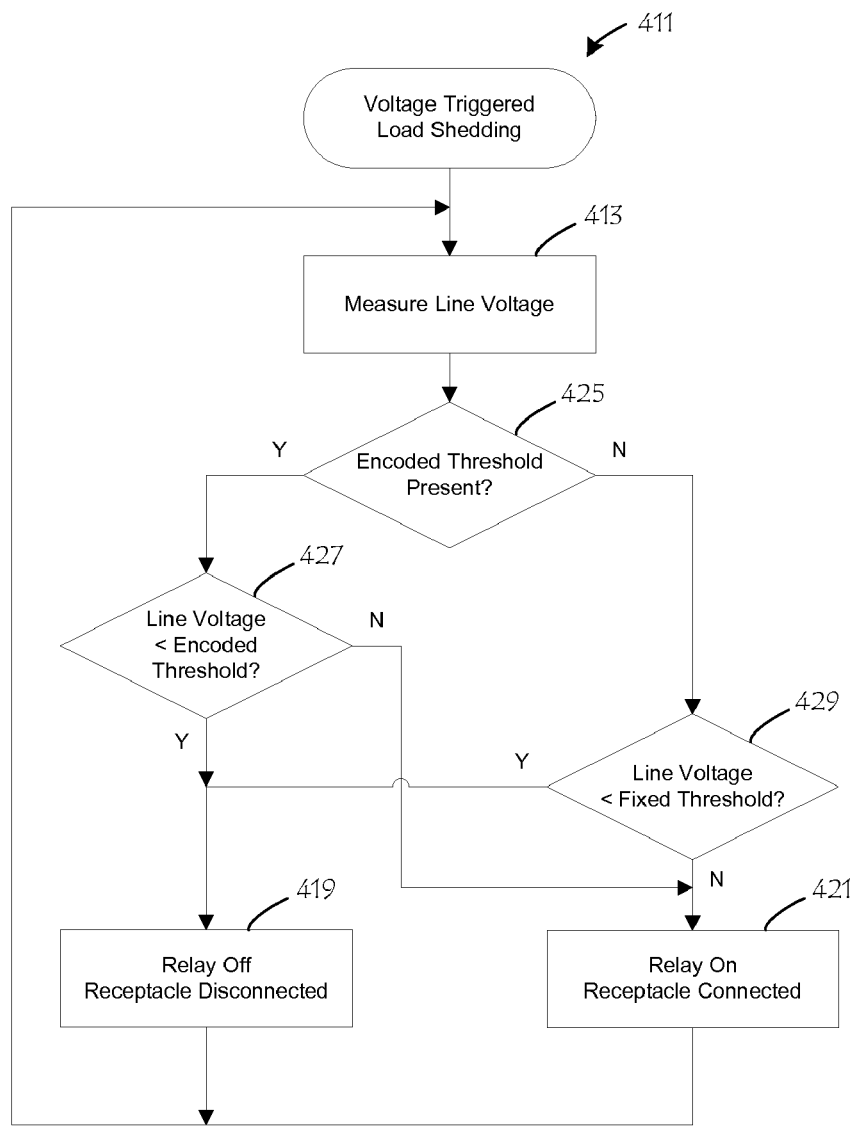
FIG. 16 is a flow chart schematically illustrating another embodiment of a method of the invention.

FIG. 16 illustrates an embodiment of method 411 of the invention of the operation of the controller 330 and the load device 326 through a flow chart. In this method, an encoded voltage threshold and a fixed threshold voltage have been set. The method 411 begins at step 413, where the line voltage is determined. For the purposes of discussion, it is assumed here that the line voltage is 116V. It is also assumed that the load device is connected when the first step takes place.

In the next step (step 425), the controller 330 determines whether the load device 326 has the data (i.e., encoded data) regarding a preselected threshold value for voltage. If it does, then the controller 330 proceeds to step 427, in which the actual value of the preselected parameter is compared to the preselected threshold value for the load device 326. For instance, if the preselected threshold value is 115V, then the controller 330 proceeds with step 419, disconnecting the load device 326 from the supply circuit 28.

Alternatively, if (for example) the preselected threshold value is 118V, then the load device 326 is not disconnected (step 421). (It will be understood that, when the load device is disconnected at the beginning of the steps, then step 421 results in the load device being reconnected, and step 419 results in the load device remaining disconnected.)

It will be appreciated that, if the load device does not have detectable data (encoded data) regarding a preselected threshold value therefor, then in the next step (step 429), it is determined whether the line voltage is less than the fixed threshold voltage. If the line voltage is less than the fixed threshold voltage, then the load device is disconnected (step 419). If the line voltage is not less than the fixed threshold, then the load device remains connected (step 421).

Figure 17:
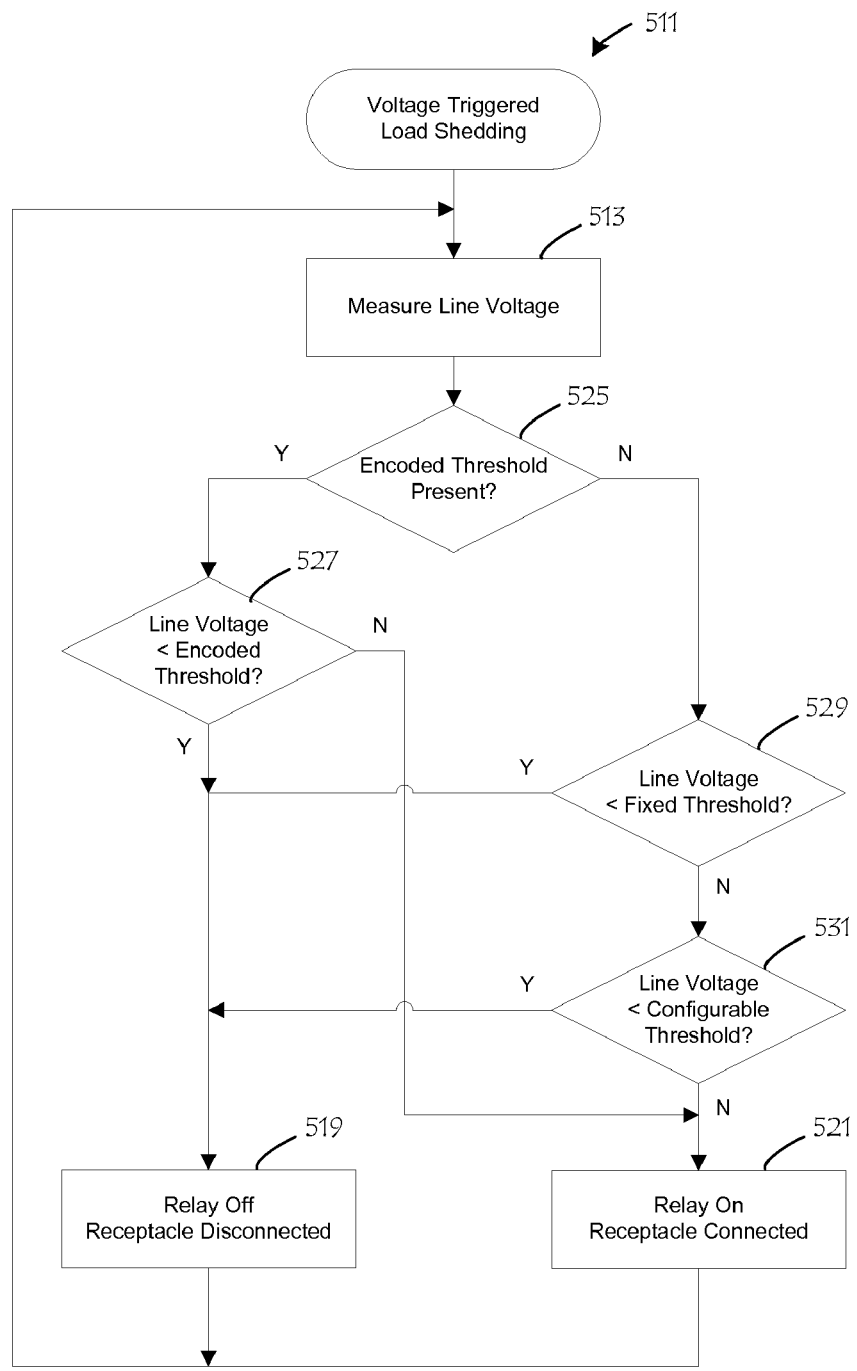
FIG. 17 is a flow chart schematically illustrating another embodiment of a method of the invention.

In another embodiment illustrated in FIG. 17, a method 511 is disclosed in which a controller 530 includes a fixed preselected threshold voltage, as well as a configurable preselected threshold voltage. In the first step, the controller determines the line voltage (step 513). In the next step, the controller determines whether the load device has encoded data regarding a preselected threshold value therefor (step 525). If the load device does not have such data, then the controller 530 determines whether the line voltage is less than the fixed preselected threshold value (step 529). If the line voltage is less than the fixed preselected threshold value, then the load device is disconnected (step 519). However, if the line voltage is not less than the fixed preselected threshold value, then the load device is not disconnected. In the next step (step 531), it is determined whether the line voltage is less than the configurable threshold. If it is, then the load device is disconnected (step 519). If not, then the load device remains connected (step 521).

However, if the controller detects encoded data in step 525, then it is determined whether the line voltage is less than the encoded threshold (step 527). If so, then the load device is disconnected (step 519). If not, then the load device remains connected (step 521). (It will be understood that, at the beginning of the method 511 as described, the load device is connected. The method is also applicable if the load device is initially disconnected, with necessary changes, i.e., the load device is reconnected (step 519) or remains disconnected (step 521), as the case may be.)

It will be appreciated by those skilled in the art that, although step 529 is shown as preceding step 531 in FIG. 17, the order in which those steps are performed (i.e., the sequence of the steps) is not functionally significant, i.e., step 531 could precede step 529. Those skilled in the art will also appreciate that the controller may be adapted to perform only one of steps 529 and 531, because such steps are functionally independent of each other and step 525. One such adaptation is illustrated in FIG. 16, in which the method illustrated excludes the steps related to a configurable threshold.

Figure 19:
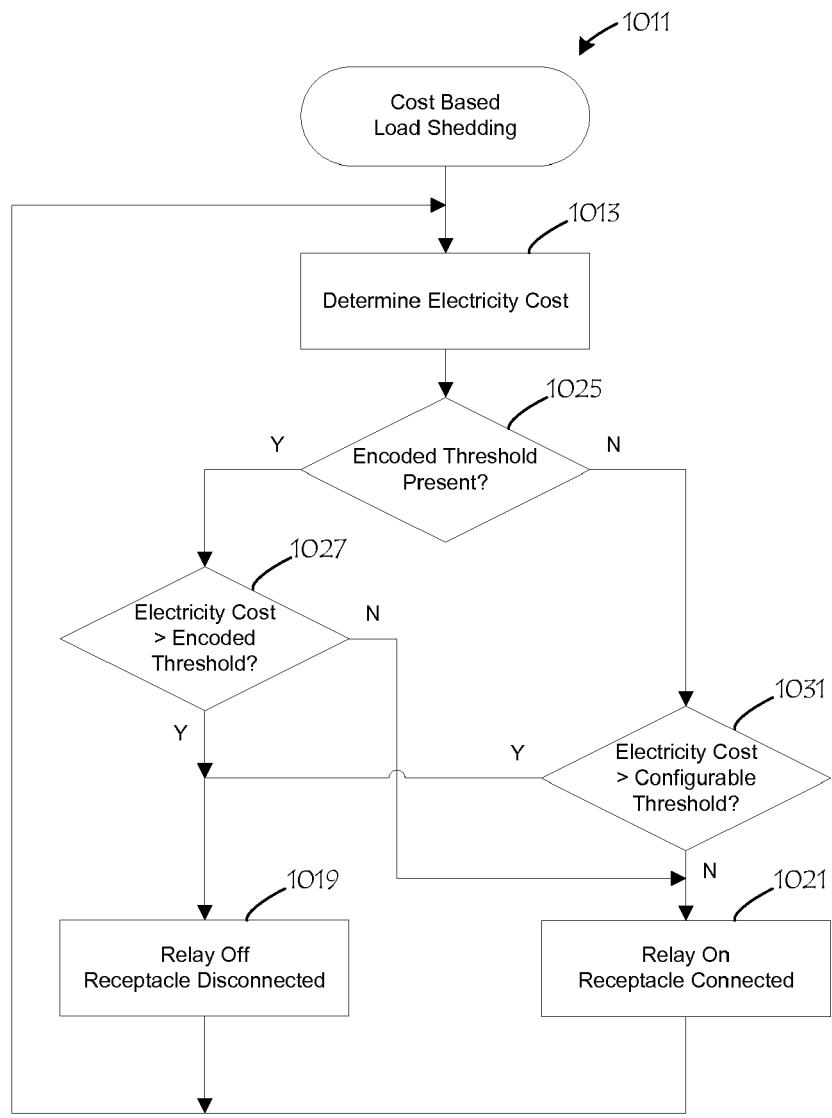
FIG. 19 is a flow chart schematically illustrating another embodiment of a method of the invention.

In another embodiment illustrated in FIG. 19, a method 1011 is disclosed in which a controller includes a configurable preselected threshold electricity cost. In the first step, the controller determines the actual electricity cost (step 1013). In the next step, the controller determines whether the load device has encoded data regarding a preselected threshold value for electricity cost (step 1025). If the load device does not have such data, then the controller determines whether the actual electricity cost is greater than the configurable preselected threshold cost (step 1031). If it is, then the load device is disconnected (step 1019). If not, then the load device remains connected.

However, if the controller detects encoded data in step 1025, then it is determined whether the actual electricity cost is greater than the encoded threshold cost (step 1027). If so, then the load device is disconnected (step 1019). If not, then the load device remains connected (step 1021). (It will be understood that, at the beginning of the method 1011 as described, the load device is connected. The method is also applicable if the load device is initially disconnected, with necessary changes, i.e., the load device is reconnected (step 1019) or remains disconnected (step 1021), as the case may be.)

As noted above, the preselected parameter may be, for example, a measurable characteristic of the electricity. Preferably, the controller includes functionality appropriate for determining such measurable characteristic, e.g., line voltage. However, if the preselected parameter is not such a measurable characteristic, then the actual value at a particular time is required to be provided to the controller.

In particular, where the consumer selects cost as at least one of the preselected parameters, the consumer's actual cost of electricity preferably is provided promptly, to enable the invention to respond promptly to variations in the cost. In one embodiment, the controller preferably includes means for determining the consumer cost at one or more selected times of the day. In another embodiment, the controller preferably includes means for accessing a database including the consumer cost at the selected time of day. The cost database may be provided by the supplier. It is also preferred that the controller includes means for receiving actual cost information from the cost database via modulation of the electrical power by the supplier, i.e., powerline communication.

Figure 6:
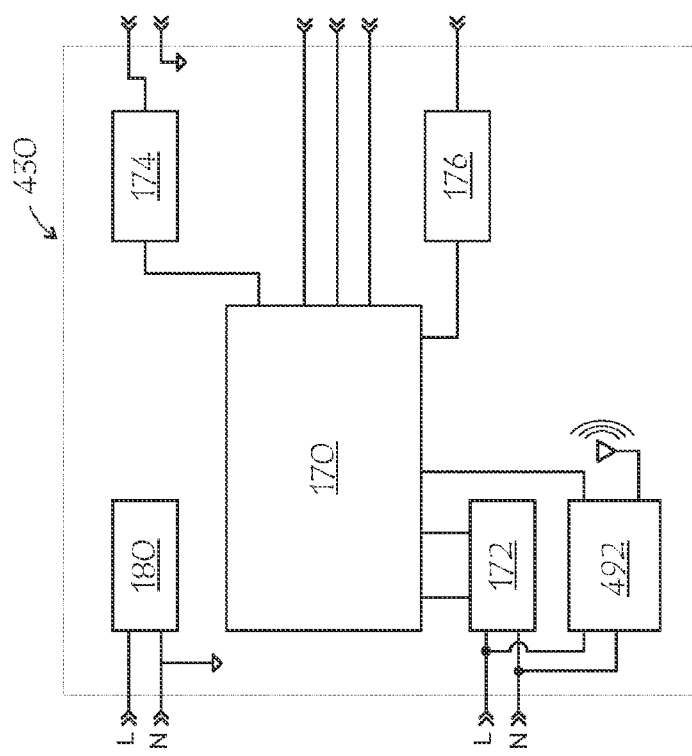
FIG. 6 is a block diagram of another embodiment of a control circuit of the invention.
Figure 21:
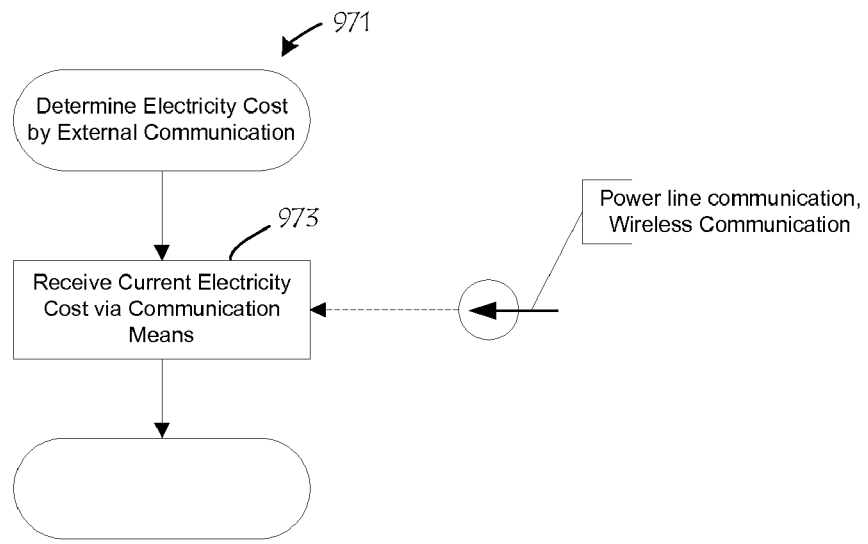
FIG. 21 is a flow chart schematically illustrating another embodiment of a method of the invention.

Preferably, and as shown in FIG. 2, the system 20 includes a communication means 198 for receiving information from an external source. (Those skilled in the art will appreciate that, alternatively, if the utility meter 118 is a "smart meter", then suitable communication means are included therein.) The communication means may be any suitable means for receiving data (e.g., actual cost data, from the supplier's database), for instance, a wi fi router. In one embodiment of the controller 430 (FIG. 6), the controller 430 includes means 492 for receiving signals communicating the current actual cost of the electricity. Such means may involve wired or wireless communication. For instance, the means 492 may be for receiving wireless communication (e.g., actual cost data) from the communication means 198, and also for transmitting other data (e.g., status information) to the communication means 198. For example, the wireless radio 492 could receive cost data from the communication means 198 (or a smart meter) and reply with status data to the communication means 98 (or the smart meter) (for instance, via an 802.11 wireless radio link providing a TCP/IP interface protocol to the internet, or alternatively an 802.15.4 wireless radio link providing a Zigbee interface protocol to the electrical utility via suitably equipped smart meter). In a method 971 of the invention for determining actual cost via external communication, the cost is obtained via any suitable means (e.g., powerline communication (i.e., power modulation) or wireless communication) from a remote source 994 (step 973) (FIG. 21).

Figure 20:
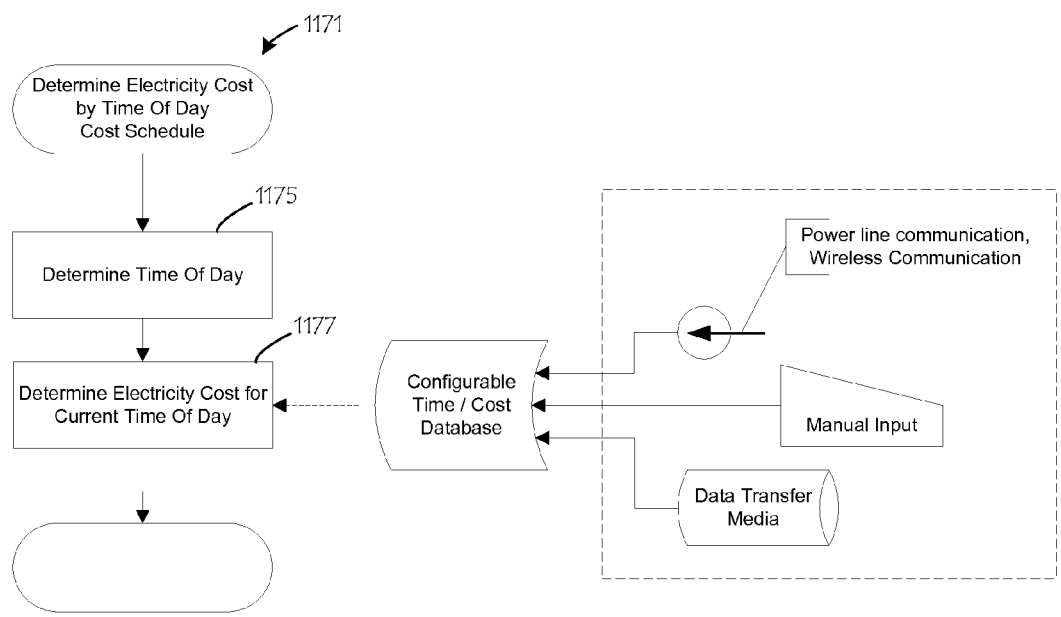
FIG. 20 is a flow chart schematically illustrating another embodiment of a method of the invention.

Another method 1171 of obtaining the current actual cost is illustrated in FIG. 20. In the first step (step 1175), the current time of day is determined. As if known, this may be done in various ways. For example, a clock may be incorporated into the controller's microprocessor, or there may be regular notification of the time via the communication means 492.

In the next step (step 1177), the current time of day is compared against a database defining periods of time of day and costs of electricity associated therewith, to determine the current actual cost. As is known, a variety of means are possible to enter information into, and edit data within, the database to ensure it accurately reflects the current cost of electricity for various time periods including but not limited to receipt of database information via communication means 492, manual data entry via pushbuttons (not shown) and data transfer via media (i.e. memory card).

As indicated above, in one embodiment, a controller of the invention is adapted to control connection (and disconnection, as the case may be) of a number of load devices. For instance, a single central controller or gateway may be connected to a number of supply circuits.

Figure 9:
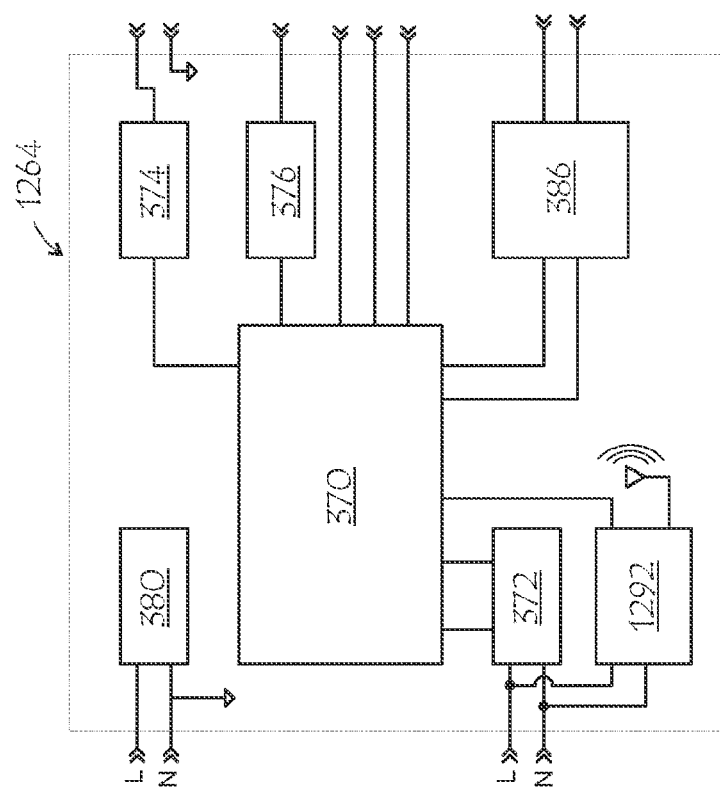
FIG. 9 is a block diagram of another embodiment of a control circuit of the invention.

An embodiment of a control circuit 1264 of a controller is schematically illustrated in FIG. 9. Preferably, the control circuit 1264 is substantially the same as the control circuit 364 (FIG. 8). As can be seen in FIG. 9, the control circuit 1264 preferably includes means 1292 for wireless communication. For example cost data preferably is provided to the controller from the supplier via the means 1292 for communication.

It will be appreciated by those skilled in the art that the invention can take many forms, and that such forms are within the scope of the invention as described above. The foregoing descriptions are exemplary, and their scope should not be limited to the preferred versions contained herein.

We claim:

1. A method of controlling connection of at least one load device to a supply circuit for distributing electricity, the method comprising:
   (a) determining at least one first actual value of at least one preselected parameter of the electricity;
   (b) comparing said at least one first actual value to a preselected threshold value of said at least one preselected parameter to determine a first difference;
   (c) comparing the first difference to a predetermined difference amount;
   (d) disconnecting said at least one load device from the supply circuit if the first difference is equal to or exceeds the predetermined difference amount;
   (e) when said at least one load device is disconnected, determining at least one second actual value of said at least one preselected parameter;
   (f) comparing said at least one second actual value to the preselected threshold value to determine a second difference;

(g) comparing the second difference to the predetermined difference amount; and
(h) reconnecting said at least one load device to the supply circuit if the second difference is zero or less than the predetermined difference amount.

2. A method of controlling connection of at least one load device to a supply circuit for distributing electricity, the method comprising:
(a) determining at least one first actual value of at least one preselected parameter of the electricity;
(b) comparing said at least one first actual value to a preselected threshold value of said at least one preselected parameter to determine a first difference;
(c) comparing the first difference to a predetermined difference amount;
(d) disconnecting said at least one load device from the supply circuit if the first difference is equal to or exceeds the predetermined difference amount;
(e) when said at least one load device is connected, determining at least one second actual value of said at least one preselected parameter;
(f) comparing said at least one second actual value to the preselected threshold value to determine a second difference;
(g) comparing the second difference to the predetermined difference amount; and
(h) connecting said at least one load device to the supply circuit if the second difference is zero or less than the predetermined difference amount.

3. A method of controlling connection of at least one load device to a supply circuit for distributing electricity, the method comprising:
(a) detecting encoded data associated with said at least one load device;
(b) reading the encoded data to identify said at least one load device;
(c) determining a first preselected threshold value of at least one preselected parameter for said at least one load device;
(d) determining at least one first actual value of said at least one preselected parameter;
(e) comparing said at least one first actual value to the first preselected threshold value to determine a first difference;
(f) comparing the first difference to a predetermined difference amount;
(g) disconnecting said at least one load device from the supply circuit if the first difference is equal to or exceeds the predetermined difference amount;
(h) when said at least one load device is disconnected, determining at least one second actual value of said at least one preselected parameter;
(i) comparing said at least one second actual value to the preselected threshold value to determine a second difference;
(j) comparing the second difference to the predetermined difference amount; and
(k) reconnecting said at least one load device to the supply circuit if the second difference is zero or less than the predetermined difference amount.

4. A method of controlling connection of at least one load device to a supply circuit for distributing electricity, the method comprising:
(a) detecting encoded data associated with said at least one load device;
(b) reading the encoded data to identify said at least one load device;
(c) determining a first preselected threshold value of at least one preselected parameter for said at least one load device;
(d) determining at least one first actual value of said at least one preselected parameter;
(e) comparing said at least one first actual value to the first preselected threshold value to determine a first difference;
(f) comparing the first difference to a predetermined difference amount;
(g) disconnecting said at least one load device from the supply circuit if the first difference is equal to or exceeds the predetermined difference amount;
(h) when said at least one load device is disconnected, determining at least one second actual value of said at least one preselected parameter;
(i) comparing said at least one second actual value to the preselected threshold value to determine a second difference;
(j) comparing the second difference to the predetermined difference amount; and
(k) connecting said at least one load device to the supply circuit if the second difference is zero or less than the predetermined difference amount.

* * * * *